June 7, 1932.  H. J. THEIS  1,861,943
POINTER FOR SCALES
Filed May 5, 1931
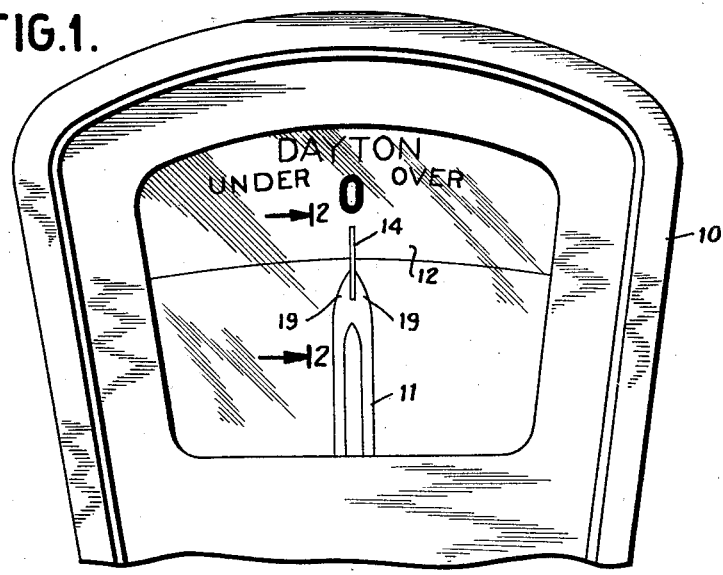
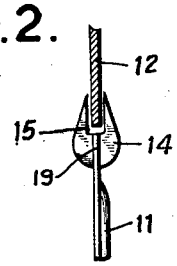
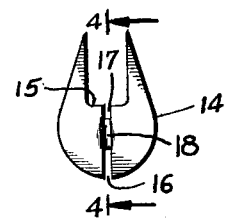
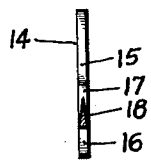
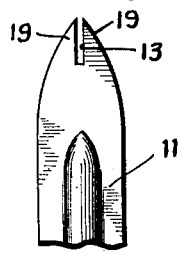
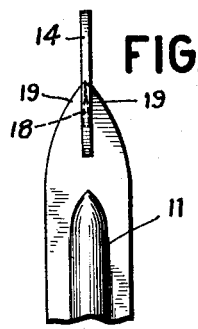
INVENTOR
Henry J. Theis
BY his ATTORNEY Patented June 7, 1932

1,861,943

UNITED STATES PATENT OFFICE

HENRY J. THEIS, OF DAYTON, OHIO, ASSIGNOR TO DAYTON SCALE COMPANY, OF DAYTON, OHIO, A CORPORATION OF NEW JERSEY

POINTER FOR SCALES

Application filed May 5, 1931. Serial No. 535,178.

The present invention relates to weighing scales in general.

The primary object of the invention is to provide a novel and improved pointer having a tip which is adapted to cooperate with a double faced chart to indicate the weight on both sides of the scale.

A more specific object is to provide a tip for a scale pointer which is simple in construction, may be cheaply manufactured, and may be fastened to the end of the pointer without the use of screws, rivets, or the like, or, if desired, without the use of welding, soldering, brazing, or similar processes.

A further object is to provide a construction which permits the use of parts formed by simple stamping processes.

Various other objects, advantages, or features of the invention will be pointed out in the following specification and claims, or will be clear from a study thereof and of the accompanying drawing.

In the drawing:

Fig. 1 is a vertical elevation of the upper portion of the casing which houses the chart of an even balance scale and shows the relation of the pointer to the chart.

Fig. 2 is a vertical section on the line 2—2 in Fig. 1.

Fig. 3 is an elevation of the tip for the pointer.

Fig. 4 is a vertical section on the line 4—4 in Fig. 3.

Fig. 5 is a front elevation of the upper end of the pointer with the tip removed.

Fig. 6 is a front elevation of the upper end of the pointer with the tip secured in place.

The number 10 identifies a well known type of even balance scale in which the pointer 11 cooperates with a suitable chart 12 mounted in the casing 10 to indicate on both sides of the chart 12 the amount the load is over or under the desired weight. The type of scale chosen to illustrate this invention has been selected solely as a convenience in describing the invention and it is not desired to limit the scope of the invention to the type of scale shown since it may be applied equally as well to any scale having a pointer and a chart movable relative to each other.

Scales are frequently so constructed that both customer and merchant may simultaneously view the chart and pointer and for that reason two charts and two pointers are often provided or a double chart may be used having weight indications on both sides cooperating with a single pointer. In case the latter type of chart is used, the tip of the pointer is frequently twisted 90° about the longitudinal axis of the pointer and the end notched so that the chart lies between the arms of the fork thus formed and the arms act like individual pointers, each cooperating with one of the chart faces. Such a construction, while very cheap to manufacture, is not entirely suitable since it is difficult to bend the pointer with sufficient accuracy and, furthermore, the bent end of the pointer is not very pleasing in appearance.

The present invention aims to overcome the foregoing defects by providing a tip so constructed that it may be readily attached to the free end of the pointer and securely fastened in place. The upper end of the pointer 11 is slotted vertically as indicated by the reference numeral 13 in Fig. 5 and is adapted to retain the tip 14 in said slot.

The shape of the tip 14 is best illustrated in Figs. 3 and 4 from which it will be seen that the tip has a notch 15 adapted to embrace the lower edge of the double faced chart 12 so that the upwardly extending prongs of the tip 14 will cooperate with the graduations on both sides of the chart when the tip is in its proper place on the free end of the pointer.

The tip 14 is provided with two vertically extending notches or slots 16, 17 on the axis of symmetry of the tip which leaves a narrow portion or constriction 18 holding the two halves of the tip together. It will be observed from Fig. 4 that the narrow portion is tapering in section from the upper edge of notch 16 to the lower edge of notch 17 for a purpose about to be described.

The first step in the operation of assembling the tip and pointer may be very readily performed by slipping the tip on the end of the pointer so that the notch 16 embraces the material of the pointer 11 below the lower end of the notch 13 and the latter embraces the narrow portion 18. The notch 13 is deep enough to permit the prongs 19 formed thereby in the pointer 11 to extend upwardly to the lower edge of the notch 15 in the tip. Preferably the notches 13, 16 and 17 are proportioned so that it requires a little pressure to force the tip upon the end of the pointer 11.

The next operation consists in applying pressure to the ends of the prongs 19 to force them toward each other into the notch 17 and the grooves formed by the tapering of the constricted portion 18. Fig. 6 shows the completely assembled tip and pointer ready for mounting in the scale and Fig. 2 illustrates the manner in which the two upstanding prongs formed by the notch 15 cooperate with both sides of the chart and act as indexes.

If desired, the tip 14 may be permanently secured to the end of pointer 11 by spot welding, soldering, brazing, or a similar process, however, for most purposes it will be sufficient to merely press the prongs 19 together.

The principal advantage of the construction just described is the simplicity of the construction of the individual parts which makes it possible to stamp them accurately and cheaply from flat sheet metal and dispense with the necessity of using fastenings of any kind such as rivets or screws, or indeed no fastening other than pressing the prongs 19 together. Other advantages are the symmetrical appearance of the tip on both sides of the scale and the accuracy of the indication secured. The tip 14 and the pointer 11 are both symmetrical with the longitudinal axis of the pointer hence there will be no unbalancing affect on the assembled pointer.

The present invention has been shown and described as embodied in a specific manner in a particular type of scale, however, it is not desired to limit the scope of the invention to the specific form shown or the type of scale illustrated as it may be varied as to details and applied to other types of scales equally as well.

I claim:

1. A tip for a scale pointer having a slot adapted to embrace the scale pointer and provided with a narrow portion adapted to be received by a slot in the end of the pointer, said narrow portion being constructed to permit pressing the prongs formed by the slot in the pointer against the narrow portion whereby to retain the tip on the end of the pointer.

2. A tip for a scale pointer having a notch forming a pair of indexes adapted to cooperate with a double faced chart to permit identical weight readings to be had on both sides of the chart, a slit adapted to embrace the pointer, and a constriction adapted to be received in a slot in the end of the pointer, said constriction being also adapted to permit pressing the prongs formed by the slot in the pointer around the constriction whereby to retain the tip firmly on the end of the pointer.

3. In combination with a scale pointer having a slit in the free end thereof, a tip having a constriction adapted to be received in said slit and arranged to permit the prongs formed in the pointer by the slit to be pressed around said constriction whereby to hold the tip on the end of the pointer.

4. In combination with a chart, a pointer cooperating with the chart, said pointer comprising two parts, one of said parts being slitted to embrace the other part and having a constriction adapted to be received in a slot in the other part and disposed to permit the material of the other part adjacent the slot to be pressed around the constriction whereby to retain the parts in assembled relation.

5. A two part scale pointer, one of the parts having a constriction adapted to be received in a slot formed in the other part, said constriction being arranged to permit the prongs formed by the slot to be pressed against the constriction to retain both parts in assembled relation.

6. A two part scale pointer comprising an index portion and a main body portion, one of said portions being adapted to be retained in a slot formed in the other and constricted to permit the walls of the slot to be pressed into contact with the constriction and thereby retain the parts in assembled relation.

7. A pointer for reading a chart having a reading face on each side comprising a main body portion and a bifurcated pointer tip having a furcation adapted to confront each side of the chart for reading the latter, said tip being formed separately and subsequently joined to the body portion of the pointer so as to be substantially integral with said body portion.

8. The invention defined in claim 7 wherein the pointer tip comprises a flat stamping extending in a plane transversely of the chart.

In testimony whereof I hereto affix my signature.

HENRY J. THEIS.